G. H. THOMPSON.
TRAP.
APPLICATION FILED SEPT. 20, 1920.
1,394,649.
Patented Oct. 25, 1921.
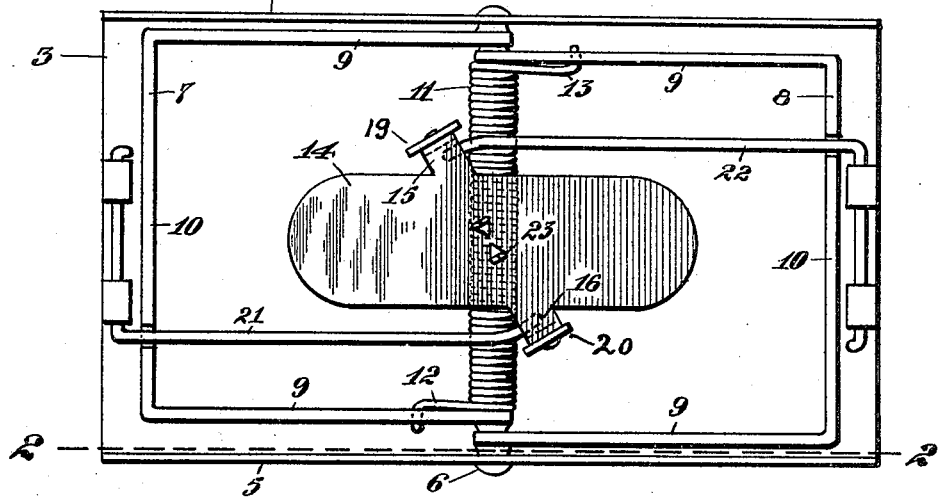
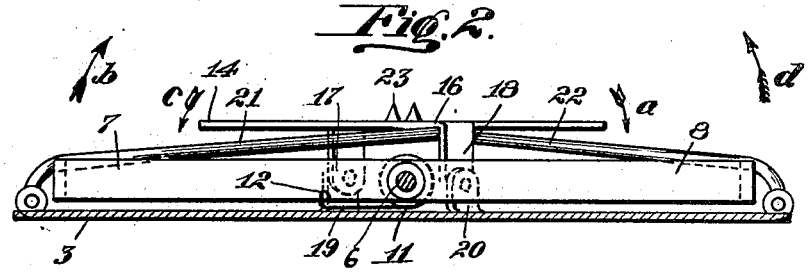
INVENTOR
GEORGE H. THOMPSON
BY
ATTORNEY

UNITED STATES PATENT OFFICE.

GEORGE H. THOMPSON, OF SANTA BARBARA, CALIFORNIA, ASSIGNOR TO HOMER N. DUFFEY, JR., OF SANTA BARBARA, CALIFORNIA.

TRAP.

1,394,649.      Specification of Letters Patent.      Patented Oct. 25, 1921.

Application filed September 20, 1920. Serial No. 411,485.

*To all whom it may concern:*

Be it known that I, GEORGE H. THOMPSON, a citizen of the United States, residing at Santa Barbara, in the county of Santa Barbara and State of California, have invented new and useful Improvements in Traps, of which the following is a specification.

This invention relates to a trap of the spring pressed jaw type, and the object thereof is to provide a trap in which a pair of jaws are so mounted and arranged that on springing the trap either one jaw or the other will operate independently, and a further object is to provide a trip mechanism whereby either of the jaws may be released and caused to operate according to the position of the animal relative to the jaws, so as to insure against the animal being thrown clear of the trap.

Other objects will appear hereinafter.

The invention is illustrated in the accompanying drawings, in which:—

Figure 1 is a plan view of the trap showing it in its set position.

Fig. 2 is a view in section and elevation as seen on the line 2—2 of Fig. 1.

More specifically, 3 indicates the base portion of the trap which may be of any suitable construction, but which is here shown as formed of sheet metal having upturned side flanges 4 and 5 to provide bosses for carrying a pivot pin 6 which extends transversely of the base member 3 centrally thereof. Mounted on the pivot pin 6 is a pair of U-shaped jaw members 7 and 8 which are adapted to be arranged to extend on opposite sides of the pivot pin in an open position; the leg portions 9 of the jaw members being pivoted on the pivot pin adjacent to the side flanges 4 and 5. The cross portions 10 of the jaw members preferably extend substantially at right angles to the side portions thereof, and thus project substantially throughout the width of the base plate between the side flanges.

Wound around the pivot pin 6 is a helical spring 11 having its terminals 12 and 13 respectively extending laterally from the spring and engaged with the jaw members 7 and 8; the spring being tensioned to normally hold the jaw members together and oppose their separation.

Arranged over the spring 11 is a trigger plate 14 which is formed with diagonally opposed projections 15 and 16 on its opposite sides, which projections have downturned end portions 17 and 18 pivotally connected to lugs 19 and 20 on the base member 3; the end portions of the trigger plate and the projections 15 and 16 projecting on the opposite sides of the pivot pin and spring so that the trigger plate will be mounted astride the spring. Pivoted adjacent to the ends on the base member are arms 21 and 22 which are adapted to be positioned to extend over the end portions 10 of the jaw members and to have their outer ends engaged beneath projections 15 and 16 of the trigger member.

In the operation of the invention, to set the trap the jaw members 7 and 8 are separated and extended in opposite directions in opposition to the spring 11. The arms 21 and 22 are then swung inwardly toward each other over the end portions of the jaw members and are arranged with their terminals extending beneath the projections 15 and 16; the ends of the arms being positioned beneath the projections by rocking the trigger plate in opposite directions to dispose the arm terminals on a plane beneath the projections, so that when the trigger plate is in an intermediate or horizontal position the end of the arm 21 will be engaged by the projection 16 and the end of the arm 22 will be engaged by the projection 15. The jaws will then be held in an open position in opposition to the spring.

The trap may be baited, if desired, by placing a suitable bail upon the trigger plate which may be fitted with a spur 23 for holding the bait.

In springing the trap on depression of either end of the rockable trigger plate as indicated by the arrows $a$ and $c$ in Fig. 2, either the arm 21 or 22 will be released so that either the jaw 7 or 8 will be actuated by the spring 11 according to which end portion of the trigger plate is depressed, for example, if the trigger plate is rocked as indicated by the arrow $a$ the projection 16 will be disengaged from the arm 21, thus releasing the latter and the jaw 7, but the projection 15 will advance farther over the arm 22 to hold the latter against disengagement and holding the jaw 8 against movement. On release of the arm 21 the jaw member 7 will move upwardly in the direction indicated by the arrow $b$ in Fig. 2, and will be thrown over to the opposite side of the trap toward the jaw 8. In like manner, in event the trigger plate 14 is rocked in the direction indicated by the arrow $c$, the projection 15 will be moved clear of the arm 22, so as to permit the jaws 8 to be operated by the spring 11 and moved in the direction indicated by the arrow $d$ toward the jaw 7 which will then be held stationary.

By thus arranging the jaws 7 and 8, so that they will operate independently according to which end of the trigger plate is depressed, the effectiveness of the trap is increased over that of the ordinary single jaw type of trap, in that to spring the trap the animal to be caught must necessarily be under the moving jaw as the operating jaw is arranged on the side of the trap opposite the end of the trigger plate to be depressed in releasing it, for example, assuming that an animal should approach the trap from either direction so as to assume a position over one of the jaws it will on depressing the portion of the trigger plate nearest to its release the opposite jaw. By this arrangement the possibility of the animal being thrown clear of the trap is largely obviated; which would occur if the animal were positioned over the released jaw, as is the case in the ordinary single jaw traps.

I claim:

1. In a trap, a pair of spring pressed jaw members adapted to be extended in opposite directions under spring tension, a rockable trigger member arranged between said jaw members, means engageable with each of said jaw members and said pivot members for holding said jaw members in their open position, said trigger member adapted on being rocked in one direction to effect release of only one of the jaw members, and when rocked in the opposite direction to release the other jaw member.

2. In a trap, a pair of independent jaw members pivoted to swing on a common center, a spring arranged to act on said jaw members to move them in opposite directions, a pair of oppositely extending arm members engageable with said jaw members to hold the latter in an extended position, and a rockable trigger arranged between said jaw members adapted to engage said arm members to hold the jaw members in their open position, and adapted on being rocked in one direction to release one of said arm members and when rocked in the opposite direction to release the other jaw member.

3. In a trap, a pair of spring pressed jaw members pivoted to swing on a common center and adapted to be arranged to extend in opposite directions under spring tension, a pair of oppositely extending arm members engageable with the jaw members to hold the latter in an extended position, a rockable trigger member arranged between said jaw members, and projections on said trigger member engageable with said arm members adapted on movement of the trigger member in one direction to release one of the arm members and to release the other arm member on movement of the trigger member in the opposite direction.

GEORGE H. THOMPSON.